(12) United States Patent
Norman et al.

(10) Patent No.: US 7,631,920 B2
(45) Date of Patent: Dec. 15, 2009

(54) SIDEWALL STORAGE ASSEMBLY WITH SLIDING COVER

(75) Inventors: Johnathan Norman, San Pedro, CA (US); Frank Paluch, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/955,022

(22) Filed: Dec. 12, 2007

(65) Prior Publication Data

US 2008/0150309 A1 Jun. 26, 2008

Related U.S. Application Data

(60) Provisional application No. 60/871,261, filed on Dec. 21, 2006.

(51) Int. Cl.
*B60R 11/06* (2006.01)
(52) U.S. Cl. .................................................. 296/37.8
(58) Field of Classification Search ............... 296/37.8, 296/37.1, 216.04, 24.34, 1.01, 1.07, 37.13, 296/24.3; 224/926, 400, 281, 280, 539, 542, 224/543
See application file for complete search history.

(56) References Cited

U.S. PATENT DOCUMENTS

| 5,924,289 | A * | 7/1999 | Bishop, II ..................... 62/3.61 |
| 6,116,674 | A * | 9/2000 | Allison et al. ............... 296/37.8 |
| 6,478,204 | B2 * | 11/2002 | Lange et al. ................. 224/539 |
| 6,547,326 | B1 * | 4/2003 | Walkinshaw et al. ... 297/188.01 |
| 6,761,388 | B2 * | 7/2004 | Lein et al. ................. 296/24.34 |
| 7,240,814 | B2 * | 7/2007 | Holmberg .................... 224/275 |
| 2004/0080173 | A1 * | 4/2004 | Niwa et al. ............... 296/24.34 |
| 2007/0075559 | A1 * | 4/2007 | Sturt ........................ 296/37.8 |
| 2007/0119885 | A1 * | 5/2007 | Miller et al. ................ 224/275 |
| 2007/0152461 | A1 * | 7/2007 | Joler et al. ............... 296/24.34 |
| 2007/0246960 | A1 * | 10/2007 | VandenHeuvel et al. ... 296/1.08 |
| 2009/0072568 | A1 * | 3/2009 | Luginbill et al. ........... 296/37.8 |

* cited by examiner

*Primary Examiner*—Kiran B. Patel
(74) *Attorney, Agent, or Firm*—Mark E. Duell; Rankin, Hill & Clark LLP

(57) ABSTRACT

A storage assembly for a vehicle console that includes a bin, a mounting panel and a cover is contained within the console such that the bin is accessible through a sidewall of the console. The bin assembly is attached to an inside surface of the sidewall in a front section of the console. When the cover is in an open position the cover occupies a gap formed by the inner surface of the sidewall and the mounting panel.

9 Claims, 4 Drawing Sheets

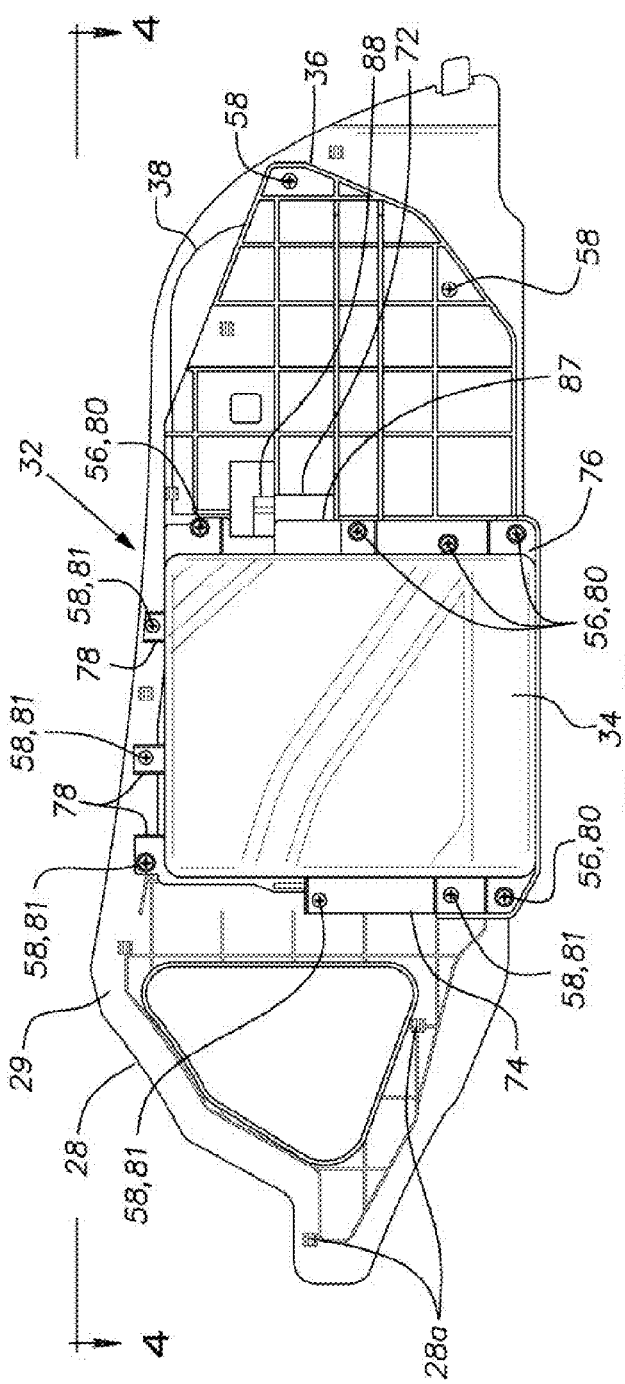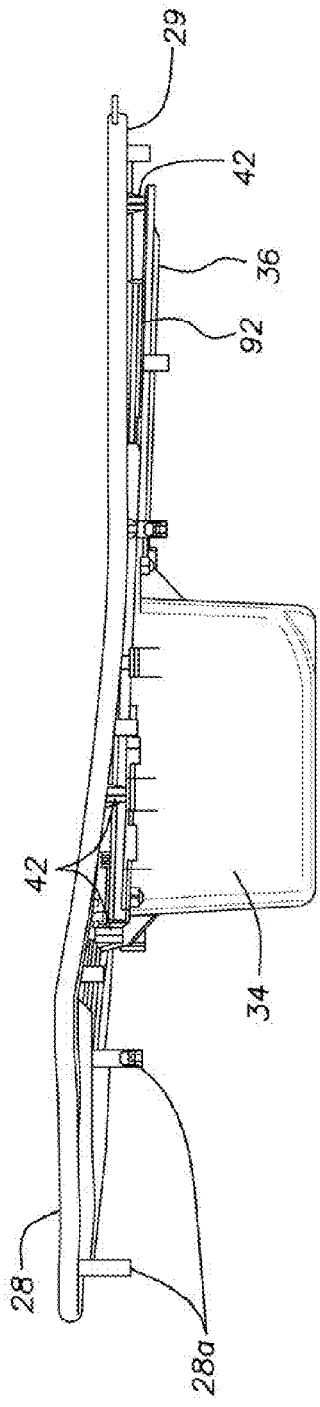

SIDEWALL STORAGE ASSEMBLY WITH SLIDING COVER

BACKGROUND OF THE INVENTION

1. Field of the Invention

The present invention relates to a console in an automotive vehicle and more specifically to a center console that includes a sidewall-storage assembly having a cover.

2. Description of Related Art

Consoles in an automotive vehicle are typically situated between the driver's seat and the front passenger seat. The console typically includes a cover pivotally attached on a top portion of the console that permits access to a storage area contained within the console. Consoles provide many functions including storage capabilities for storing CD's, sunglasses, maps, etc., comfort capabilities (e.g. serving as an arm rest), convenience features (e.g. power ports, cup holders, etc.), etc. Further, in many vehicles a gear shift and/or parking brake lever may be housed within the console as well as other vehicle control functions.

One disadvantage, however, with typical consoles is the limited storage area. Thus, what is needed is a console that provides additional storage space than the conventional storage area in a traditional console.

SUMMARY OF THE INVENTION

A solution to the above mentioned disadvantage is to utilize the space in a front section of the console in front of the conventional storage area, adjacent to the passenger's feet. This space is currently unused space that can be utilized as a storage area. More specifically, this space can be used to house a storage bin accessible through a sidewall of the console. Thus, more storage space can be obtained without occupying additional space in the available seating area for the passengers.

In accordance with one aspect of the present invention, a storage assembly for a console is provided comprising a mounting panel and a bin operatively attached to the mounting panel where the mounting panel and bin further include mounting openings for operatively attaching the bin to the mounting panel and attachment openings for operatively attaching the storage assembly to the console and where the bin is disposed in a front portion of the console when the storage assembly is operatively attached to the console.

In accordance with another aspect of the present invention, a console for an automotive vehicle is provided comprising a top portion, a front portion, a rear portion, a left and right sidewall, and a storage assembly contained within the console where the storage assembly includes a bin and a mounting panel and where the storage assembly is operatively attached to an inside surface of one sidewall such that the bin is disposed in the front portion of the console.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

FIG. 3 is a rear plan view of the storage assembly shown in FIG. 1.

FIG. 4 is a top view of the storage assembly as viewed from the line 4-4 shown in FIG. 3.

DETAILED DESCRIPTION OF THE INVENTION

Figure 1:
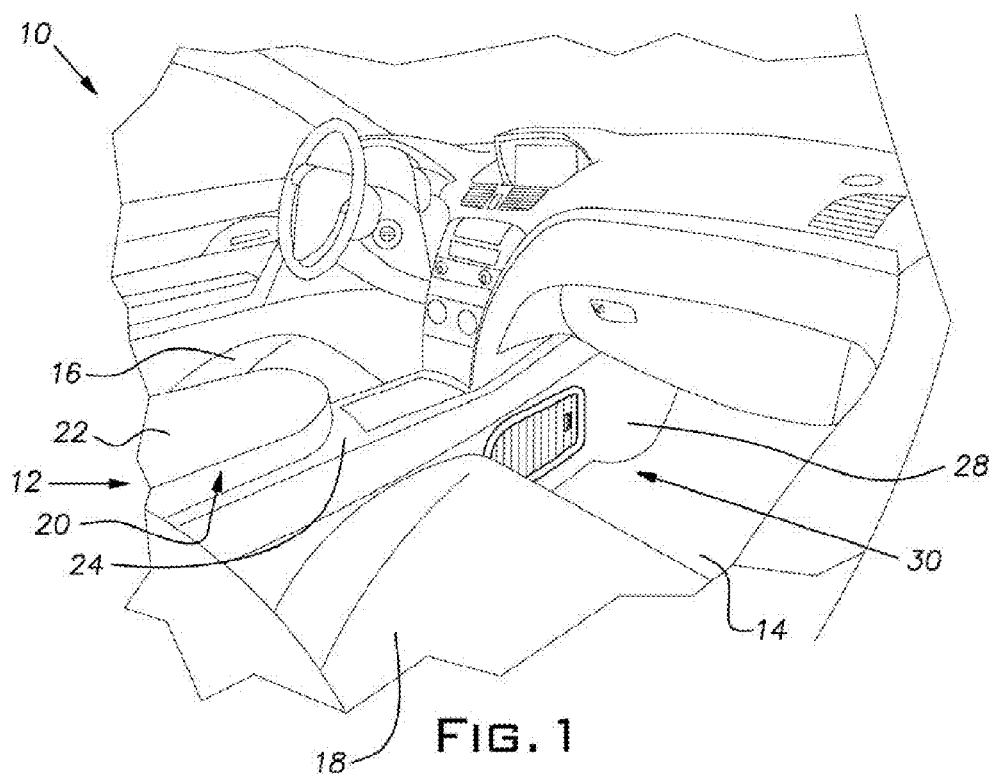
FIG. 1 is a perspective view of a console showing the location of a sidewall-storage assembly in accordance with the present invention.

Referring now to the drawings, FIG. 1 shows a perspective view of a typical vehicle interior 10 including a console 12. The console 12 is preferably located on a floor 14 of the vehicle 10 between a driver's seat 16 and a passenger's seat 18 and includes a storage area 20 having a pivotal lid 22. The console 12 may include additional features, such as but not limited to cup holders, power ports, an arm rest, etc. Further, a gear shift and/or parking brake lever may be housed in the console 12 relatively forward of the storage area 20. It should be noted, however, that the gear shift may be mounted on the steering-wheel column.

Referring to FIG. 1, in addition to the storage area 20 and lid 22, the console 12 includes a top portion 24, left and right sidewalls 28 and a front portion 30. The front portion 30 is the portion of the console 12 located in front of the storage area 20, and has a smaller vertical height with respect to the floor 14 than the storage area 20.

Figure 2:
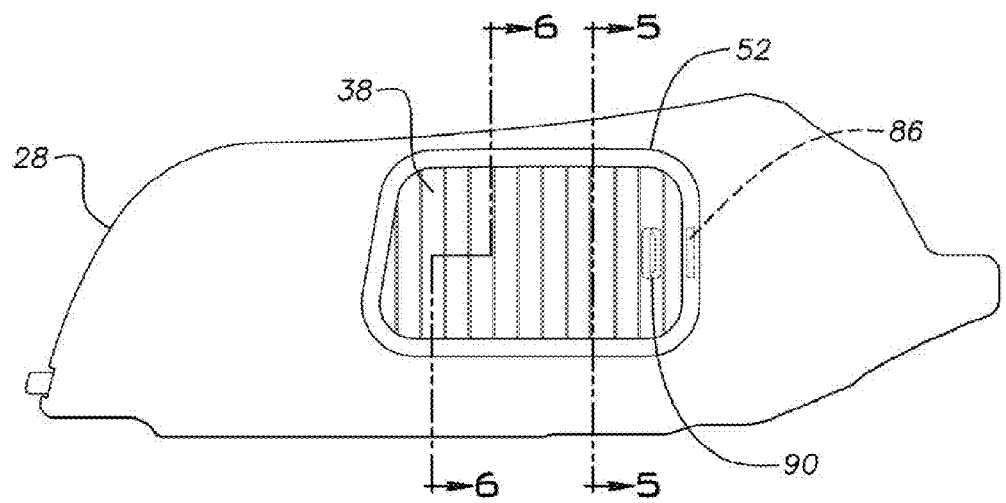
FIG. 2 is a front plan view of the storage assembly shown in FIG. 1.

Referring to FIGS. 2 and 3, attached to an inside surface 29 of the right sidewall 28 is a storage assembly 32 comprising a bin 34, a mounting panel 36 and a cover 38. The bin 34 may be used to store items such as CD's, maps, glasses, etc. The storage assembly 32 is attached to the inside surface 29 of the right sidewall 28 such that the bin 34 is disposed in the front portion 30 of the console 12, as shown in FIG. 1. The storage assembly 32 shown in the figures is designed to attach to the inside surface 29 of the right sidewall 28. It should be noted, however, that with simple modifications the storage assembly 32 can be easily adapted to attach to the inside surface of the left sidewall. Thus, the embodiment shown in the figures is for illustrative purposes only and is not intended to limit the scope of the invention.

Referring to FIGS. 3-6, the right sidewall 28 is a generally flat panel having a peripheral shape conforming to the vehicle console design. The sidewall has a series of mounting tabs 28a, standoffs (not shown), and mounting posts 42 extending from the inside surface 29 thereof. The sidewall also defines a first access opening 48 that has a finishing trim piece 52 mounted therearound.

The mounting tabs 28a permit the sidewall to be secured to the underlying console support structure or framework, as is known in the art. The standoffs and mounting posts 42 permit attachment of the storage assembly 32 to the inside surface 29 of the right sidewall 28. The standoffs and mounting posts 42 have a height such that a space or gap is provided between the mounting panel 36 and inside surface 29 of the right sidewall 28 to allow the cover 38 to slide between a closed position and an open position, as will be described further below. Each of the mounting posts 42 defines a post opening 44 to permit the insertion of a fastener 46. It should be noted that the fasteners 46 described herein may be any type of mechanical fastener 46 known in the art, such as screws, clips, rivets, etc. The fasteners 46 in the embodiment shown in the figures are screws.

The first access opening 48 of the right sidewall 28 allows access to the inside or storage portion of the bin 34. The trim piece 52 attached around the perimeter 50 of the first access opening 48 provides a clean appearance to the opening and assists in securing the mounting panel 36 to the sidewall 28. More specifically, a series of U-shaped clips 54 integrally extend from a rear side of the trim piece 52 at spaced apart intervals around the first access opening 48. The clips 54 receive associated portions of the mounting panel 36 and thereby secure the mounting panel 36 to the sidewall 28 about the mounting opening 48, as will be described further below.

Still referring to FIGS. 3-6 the mounting panel 36 is a generally planar body, preferably formed from a hard plastic material, that is adapted to be mounted to the inside surface 29 of the sidewall 28. The mounting panel 36 slidably supports the cover 38 for movement between the open and closed positions, and serves as a support to which the bin 34 is affixed.

The mounting panel 36 defines a second access opening 66, bin mounting openings 56 to mount the bin 34 to the mounting panel 36, and side panel mounting openings 58 to attach the mounting panel 36 to the inside surface 29 of the right sidewall 28. The mounting panel 36 also includes a series of flat protrusions 64, and upper and lower guide rails 60, 62.

The side panel mounting openings 58 are positioned such that they align with the mounting posts 42 on the inside surface 29 of the right sidewall 28. The upper and lower guide rails 60, 62 are disposed above and below, respectively, the second access opening 66 and are designed to hold and retain the cover 38 as it slidably moves between the open and closed positions. Thus, the cover 38 slides on the lower guide rail 62 and is retained by the upper guide rail 60. The flat protrusions 64 extend outwardly (i.e., toward the sidewall 28). The flat protrusions 64 are inserted into the U-shaped clips 54 on the rear side of the trim piece 52 when the mounting panel 36 is secured to the inside surface 29 of the right sidewall 28. Preferably, a damping material (e.g., felt, not shown) is attached to each flat protrusion 64 to minimize any vibration that may occur between the mounting panel 36 and the trim piece 52.

The mounting panel second access opening 66 is aligned with the first access opening 48 and has a perimeter 68 that cooperates with and at least partially matches that of the right sidewall first access opening 48. A U-shaped recess 72 is formed in the mounting panel 36 adjacent the second access opening 66. The U-shaped recess 72 receives a portion of the cover 38 to limit the movement of the cover 38 from the closed position to the open position, as will be described further below.

Referring to FIGS. 3 and 4, the bin 34 is a generally bowl-shaped member formed from a hard plastic material. The open end of the bowl-shaped bin 34 defines a third access opening 82 that issues laterally so as to face toward an interior of the passenger compartment and thereby readily permit introduction of items into, and withdrawal of items out of, the bin 34.

The bin 34 includes a left mounting flange 74, a right mounting flange 76, and a series of upper mounting flanges 78. Each mounting flange 74, 76, 78 may include bin flange mounting openings 80, bin/side panel mounting openings 81, or a combination of the two. The bin flange mounting openings 80 are aligned with the bin mounting openings 56 in the mounting panel 36, to mount the bin 34 to the mounting panel 36. The bin/side panel mounting openings 81 are aligned with side panel mounting openings 58 to mount the bin 34 and the side panel 36 to the right side wall 28.

The third access opening 82 provided by the bin 34 is surrounded by a perimeter 84 that is secured around the second access opening 66 of the mounting panel 36. Thus, the access openings 48, 66, 82 are registered or aligned with one another so as to permit access to the bin interior. A slot 86 (shown in phantom in FIG. 2) is located on a right side of the perimeter 84 of the third-access opening 82. The slot 86 acts as a catch to secure the cover 38 when the cover 38 is in a closed position, as will be described further below. A U-shaped recess 87, which conforms to the U-shaped recess 72 in the mounting panel 36 described above, is located on an opposite side of the third access opening 82.

Figure 5:
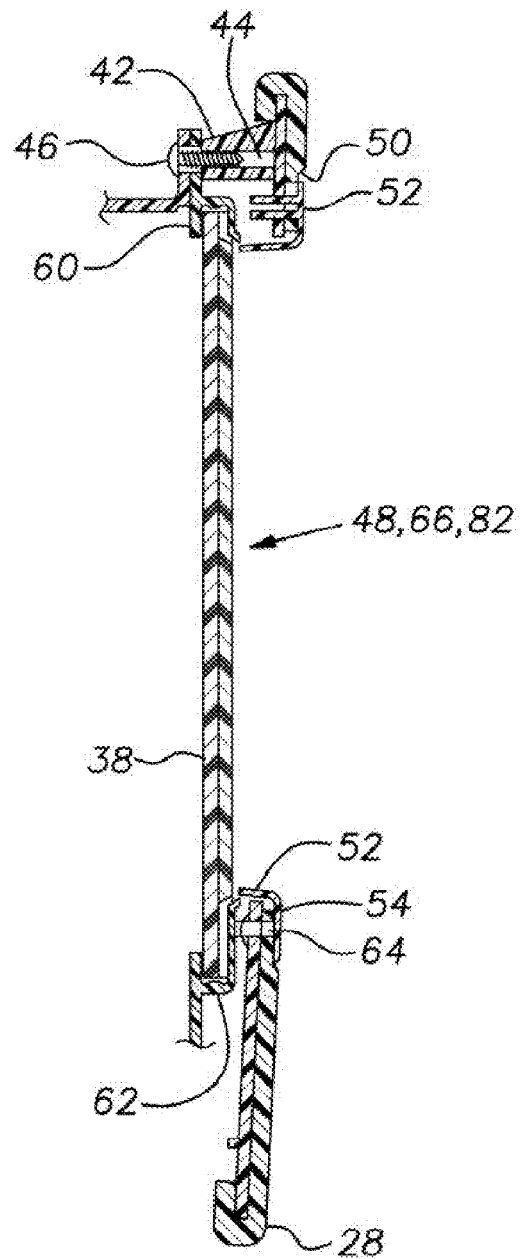
FIG. 5 is a cross-sectional view of the storage assembly including a cover taken along line 5-5 shown in FIG. 2.
Figure 5A:
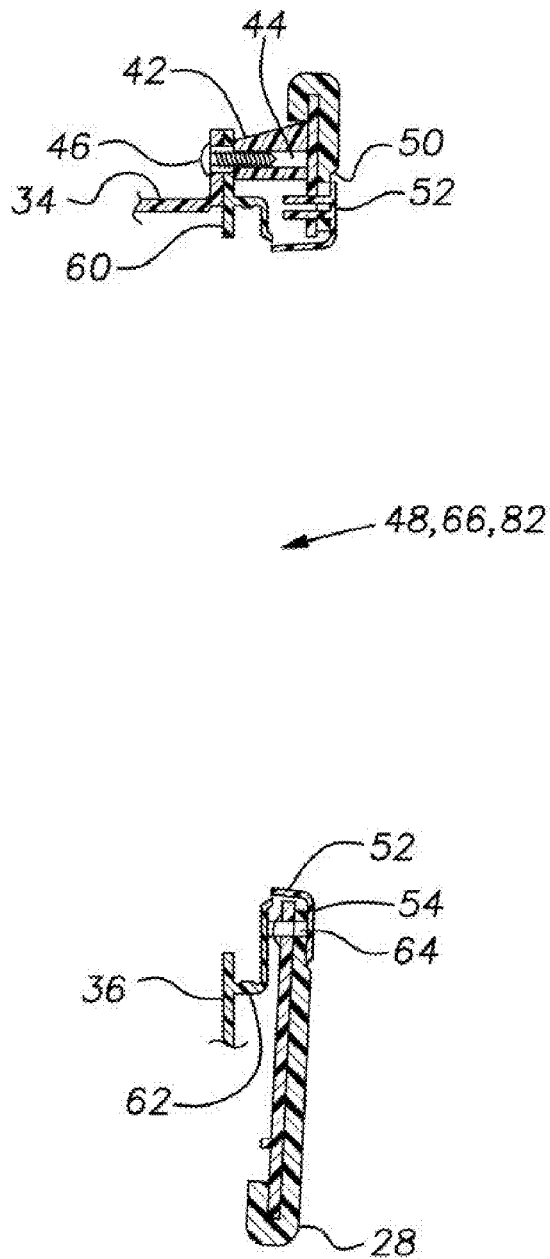
FIG. 5A is a cross-sectional view of the storage assembly without the cover taken along line 5-5 shown in FIG. 5.
Figure 6:
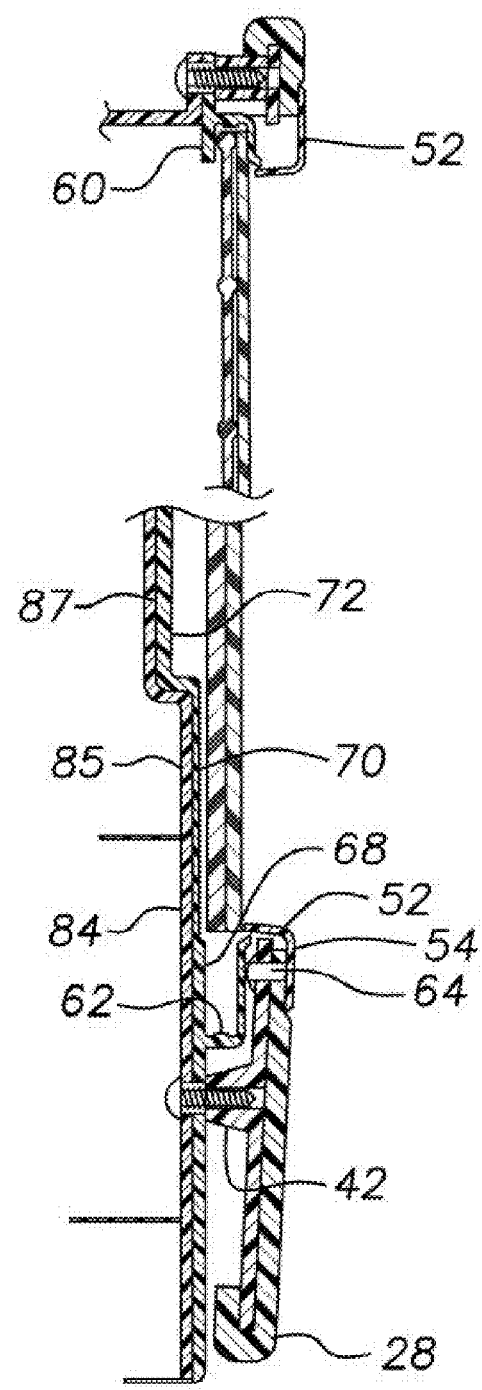
FIG. 6 is a cross-sectional view of the storage assembly taken along line 6-6 shown in FIG. 2.

Referring to FIGS. 2-3 and 5, the cover 38, which may be considered optional in some installations, is a generally planar member that is slidably received in the upper and lower guide rails 60, 62, and includes a protruding stop 88 and a latching mechanism 90.

The stop 88 is disposed on a rear of the cover 38 in a position that engages the mounting panel 36 adjacent the U-shaped recess 72 to limit the movement of the cover 38 in the opening direction. Thus, as the cover 38 is moved into the open position, the stop 88 is received or slides in the U-shaped recess 72 and engages the mounting panel 36 adjacent the end of the U-shaped recess 72 so as to prevent further opening movement of the cover 38.

The cover 38 may include a latching mechanism 90 to releasably secure the cover 38 in the closed position. Preferably, the latching mechanism 90 includes a user-engaged portion on a front surface of the cover 38 that is integrated with a tab (not shown) located on the rear side of the cover 38 such that movement of the user-engaged portion moves the tab toward the cover upon depression of the user-engaged portion. Thus, when the cover 38 is moved from an open position to a closed position the tab engages the slot 86 on the bin 34 to secure the cover 38 in the closed position.

With the cover 38 received in the upper and lower guide rails 60, 62, the bin 34 is affixed to the mounting panel 36 by aligning the bin flange mounting openings 80 with the bin mounting openings 56 and installing the fasteners 46 therethrough. Similarly, the mounting panel 36 is attached to the inside surface 29 of the right sidewall 28 by aligning the side panel mounting openings 58 with the sidewall mounting posts 42 and installing the fasteners 46 therein. Thus, when the storage assembly 32 is attached to the inside surface 29 of the right sidewall 28, the first, second and third access openings 48, 66, 82 are aligned to permit access to the inside portion of the bin 34.

Referring to FIG. 4, due to the mounting posts 42 and standoffs, when the storage assembly 32 is attached to the right sidewall 28, a space or gap 92 is formed between the inside surface 29 of the right sidewall 28 and the mounting panel 36. The space or gap 92 is partially occupied by the cover 38 as the cover 38 is moved from the closed position to the open position. Thus, the cover 38 is supported and protected during such movement, and it is insured that movement of the cover does not interfere with other portions of the vehicle that may be received within the console.

While specific embodiments of the invention have been described and illustrated, it is to be understood that these embodiments are provided by way of example only and that the invention is not to be construed as being limited but only by proper scope of the following claims.

What is claimed is:

1. A console for an automotive vehicle, comprising:
a top portion;
a front portion;
a rear portion;
left and right sidewalls; and
a storage assembly contained within the console, the storage assembly including a bin and a mounting panel;
wherein the storage assembly is operatively attached to an inside surface of one of the sidewalls such that the bin is disposed in the front portion of the console and is accessible through said one sidewall.

2. The console of claim 1, wherein the rear portion of the console provides a storage area, and wherein the front portion of the console is located relatively forward of the storage area, and wherein the front portion has a vertical height that is relatively smaller than a vertical height of the storage area.

3. The console of claim 2, wherein the storage assembly further comprises a slidable cover that is movable between an open position and a closed position, said cover having a stop located on the rear side thereof, wherein the mounting panel defines a U-shaped recess that receives the stop when the slidable cover is moved from the closed position to the open position, and wherein the stop engages a surface of the mounting panel adjacent the U-shaped recess to limit movement of the slidable cover.

4. The console of claim 3, wherein the inside surface of the one sidewall further includes mounting posts and standoffs, wherein the bin and mounting panel define openings, and wherein the mounting posts and openings are aligned with one another so as to permit attachment of the storage assembly to the inside surface of said one sidewall.

5. The console of claim 4, wherein the mounting posts and standoffs to space the mounting panel from the inside surface of the one sidewall and thereby define a gap therebetween, and wherein the cover is slidably received in the gap.

6. The console of claim 5, wherein the slidable cover further includes a latching mechanism, wherein the latching mechanism includes a tab located on a rear side of the slidable cover, and wherein the tab engages a slot in the bin to releasably retain the cover in the closed position.

7. The console of claim 6, wherein the mounting panel further includes upper and lower guide rails that receive and retain the slidable cover, and wherein cover slides on the upper and lower guide rail as the cover moves between the open and closed positions.

8. The console of claim 7, wherein the one sidewall further includes an access opening and a trim piece is disposed around a perimeter of the access opening, and wherein the trim piece includes U-shaped clips located on a rear side of the trim piece surrounding the access opening.

9. The console of claim 8, wherein flat protrusions project from the mounting panel toward the one sidewall, and wherein each flat protrusion is received by an associated U-shaped clip receive the flat protrusions.

* * * * *